Apr. 17, 1923.

Re. 15,582

R. C. RUSSELL

INDEX

Original Filed Oct. 25, 1917

| NUM. EQUIV. | PHONETIC ELEMENT |
|---|---|
| 1 | a,e,i,o,u,y. |
| 2 | b,f,p,v. |
| 3 | c,g,k,q,s,x,z. |
| 4 | d,t |
| 5 | l. |
| 6 | m. |
| 7 | n. |
| 8 | r. |

Inventor

R. C. Russell

By Seymour & Bright

Attorneys

Reissued Apr. 17, 1923. Re. 15,582

UNITED STATES PATENT OFFICE.

ROBERT C. RUSSELL, OF PITTSBURGH, PENNSYLVANIA.

INDEX.

Original No. 1,261,167, dated April 2, 1918, Serial No. 198,458, filed October 25, 1917. Application for reissue filed November 21, 1921. Serial No. 516,860.

*To all whom it may concern:*

Be it known that I, ROBERT C. RUSSELL, a citizen of the United States, and a resident of Pittsburgh, in the county of Allegheny and State of Pennsylvania, have invented certain new and useful Improvements in Indexes; and I do hereby declare the following to be a full, clear, and exact description of the invention, such as will enable others skilled in the art to which it appertains to make and use the same.

This invention relates to improvements in indexes which shall be applicable either to the "card" or "book" type,—one object of the invention being to provide an index wherein names are entered and grouped phonetically rather than according to the alphabetical construction of the names.

A further object is to provide an index in which names which do not have the same sound do not appear in the same group, thus shortening the search.

A further object is to provide an index in which each name or group of names having the same sound but differently spelled shall receive the same phonetic description and definite location.

With these and other objects in view, the invention consists in certain novel features as hereinafter set forth and pointed out in the claims.

Figure 1:
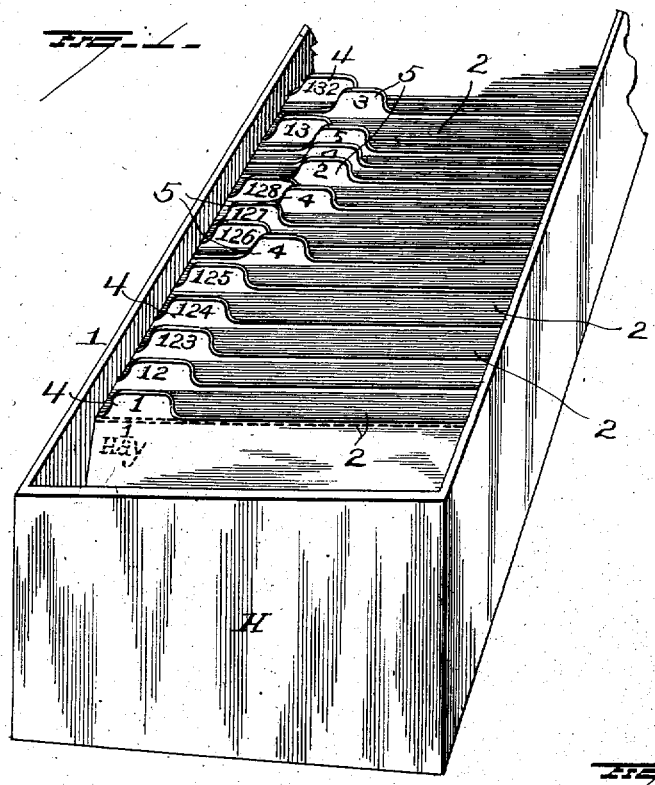
Figure 2:
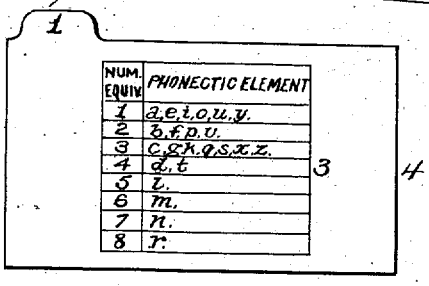
Figure 3:
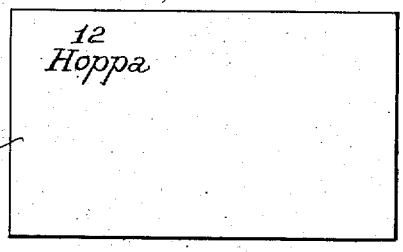
Figure 4:
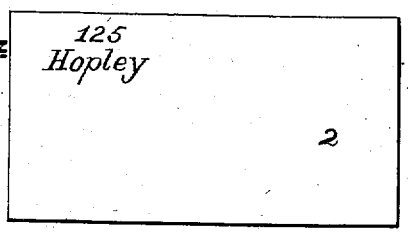
Figure 5:
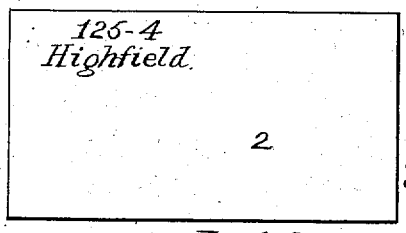

In the accompanying drawings; Figure 1 is a view of a portion of a card index embodying my invention; Figure 2 is a view of one of the cards containing the phonetic key element arrangement, and Figures 3, 4 and 5 are views of certain of the index cards or elements.

While my improved index may be arranged either in book form or as a card index, I have illustrated the same as the latter and will refer to cards on which the names are entered as "index elements" which terms are also intended to comprehend leaves of a book when the latter is employed instead of cards, and the table representing the phonetic arrangement, which may be printed upon cards of the set or in the books of the index, may be known as a "key element."

There are certain sounds which form the nucleus of the English language, and these sounds are inadequately represented merely by the letters of the alphabet, as one sound may sometimes be represented by more than one letter or combination of letters, and one letter or combination of letters may represent two or more sounds. Because of this, a great many names have two or more different spellings which in an alphabetical index, or an index which separates names according to the sequence of their contained letters in the alphabet, necessitates their filing in widely separated places.

With the use of certain primary sounds and by grouping such sounds as may be represented by the same letters, I have devised a phonetic arrangement which is an important characteristic of my improved index, and with the use of which I am enabled to group names, not according to their spelling but in accordance with their sounds or phonetic values.

The phonetic arrangement which I employ comprises eight divisions, as follows:—

First: The oral resonants represented by their alphabetical equivalents a, e, i, o, u, and y and their various combinations.

Second: The labials and labio-dentals,—the former being represented by b p and sometimes f, and the latter being represented by v and sometimes f.

Third: The gutturals and the sibilants,—the former being represented by g k q and sometimes x, and the latter being represented by c s z and sometimes x.

Fourth: The dental-mutes represented by t and d.

Fifth: The palatal-fricative represented by l.

Sixth: The labio-nasal represented by m.

Seventh: The dento or lingua-nasal represented by n.

Eight: The dental-fricative represented by r.

The eight elements comprising the phonetic arrangement may be graphically represented as follows:

No. 1—a–e–i–o–u–y.
No. 2—b–f–p–v.
No. 3—c–g (discard gh)–k–q–x–s (discard final s)–z (discard final z).
No. 4—d–t
No. 5—l
No. 6—m
No. 7—n
No. 8—r For convenience, the phonetic elements may be represented by one of its contained letters, preferably the first where there are more than one, or the several phonetic elements may be represented by different emblems, but I prefer to use numerals from 1 to 8 to identify said elements on the index cards.

In element 3, the diagraph "g h" is not considered representative of the element, as the same is usually silent, as in the name "Wright". Final "s" and "z" are disregarded, as usually the omission or addition of the final sibilant is immaterial in the pronunciation of a name as in the name "Myers."

Without exception, when two letters which represent the same element, or a repetition of the same letter, occur in a name, without being separated by a member of a different element, only the first is regarded. Thus the phonetic valuation of "Mack" is "M–a–c", and of "Ball", "B–a–l".

Element 1 (the vowels) is used only once in a name, regardless of how many times a vowel may appear in the name. Thus, the name "Carter" is phonetically represented by "C–a–r–t–r".

In the practical application of my invention, it is desirable to regard the inital letters of the names in their alphabetical significance. This allows the division of the index into twenty-six parts according to the initial letters of the names. Then the phonetic arrangement is applied, making the subdivisions of each surname initial lettter group conform to a phonetic rather than the alphabetical standard.

By representing the several phonetic elements by numerical equivalents as previously explained, the names may be indexed according to decimal arrangement.

In the drawings, 1 represents the "H" box of a card index and 2 represents the index cards or elements, while a key element is shown at 3.

Each index card has numerals thereon representing phonetic values according to the key element and indicating the phonetic pronunciation of the name on the card. It is of course understood that any desired reference data may be produced upon the index cards.

The index cards are arranged according to the numerals composing the phonetic-designations thereon. Thus a name which is represented by the phonetic element 1 will have this numeral on the card and all similarly sounding names will be grouped together. Likewise, names having phonetic elements 1 and 2 will be next grouped, and so on. Names which require the use of a fourth phonetic element to indicate their terminal portion may be arranged in sub-groups as indicated in Fig. 1. For convenience, the various groups may be separated by guide cards 4–5 on which the numerals representing the phonetic elements may be produced, and these cards may also contain the phonetic key element table.

Figure 3 represents an index card with the name Hoppa thereon and such name is represented by the phonetic element 1 2, since "o" appears in element 1 and "p" in element 2. In this same group, such names as Happe; Hoppa; Hoopey; Haup; Happ; Hapf and Hop, would be found, and the key elements 1 2 are placed on such cards.

An index card is shown in Figure 4 having the name Hopley and the numerals "1 2 5" thereon,—"o" being represented by the phonetic key element "1"; "p" by the key element "2" and "l" by the key element "5".

An index card is shown in Figure 5 having the name "Highfield" and four key elements thereon,—viz., 1 2 5, and 4 as a subdivision. Thus the name is represented by 1=i; 2=f; 5=l and 4=d.

It will be understood that some names will be represented by a single key element,—thus the cards having such names as "Hay", Hayes, and Haas, may have the single key designation "1" thereon.

My improvements insure accuracy and thoroughness of a search as the names having similar sounds are grouped together, and the search will be facilitated by arranging the index elements in the numeral order indicated by the key element numerals thereon, as previously explained.

Having fully described my invention what I claim as new and desire to secure by Letters-Patent, is:—

1. An index comprising a key element and a plurality of index elements, said key element comprising designations representing phonetic subdivisions, and said index elements adapted to receive names arranged in accordance with the phonetic key designations, and means associated with the said index elements whereby the location among the index elements for names arranged in accordance with the phonetic key element may be determined.

2. An index comprising a key element and a plurality of index elements, said key element comprising designations representing phonetic subdivisions, and said index elements having thereon phonetic key designations in accordance with the names entered on said index elements and in accordance with the phonetic key designations of said key element.

3. An index comprising an element having thereon a key having designations representing phonetic divisions of the alphabet, and a plurality of elements for the reception of surnames arranged in accordance with said phonetic key and having designations thereon in accordance with said key designations.

4. An index comprising a key element and a plurality of index elements, the said key element having designations thereon representing phonetic values comprising successively, oral resonants, labials and labio-dentals, gutterals and sibilants, dental-mutes, palatal-fricative, labio-nasal, dento or lingua-nasal, and dental-fricative, and the index elements having thereon said phonetic key designations according to the names entered on said index elements.

5. An index comprising a key element and a plurality of index elements, the said key element having designations thereon representing phonetic alphabetic divisions, to wit, first, "a" "e" "i" "o" "u" and "y" and their various combinations; second "p" "b" "f" "v"; third, "g" "k" "q" "x" "c" "s" "z"; fourth "d" and "t"; fifth "l"; sixth "m"; seventh "n," and eighth, "r," and said index elements having designations thereon corresponding to said key designations and in accordance with names entered on the said index elements.

6. An index comprising a key element and a plurality of index elements, said key element comprising numerical designations representing phonetic subdivisions, and said index elements having thereon phonetic key designations in accordance with the names entered on said index elements and in accordance with the phonetic designations of said key element; said index elements being arranged in regular order according to the arrangement of the numerical key element designations thereon.

7. An index comprising a key element and a plurality of index elements, said key element comprising numerical designations representing phonetic subdivisions, and said index elements having thereon phonetic key designations in accordance with the names entered on said index elements and in accordance with the phonetic designations of said key element, said index elements being arranged according to the arrangement of the key element numerals and subdivided according to said key element numerals when more than three of such key element numerals appear on a card.

In testimony whereof, I have signed this specification in the presence of two subscribing witnesses.

ROBERT C. RUSSELL.

Witnesses:

J. Clifford Russell,
Robert A. Dodds.